United States Patent [19]
Ferriday et al.

[11] 3,957,700
[45] May 18, 1976

[54] FILLED AMINOPLAST MOULDING MATERIALS

[75] Inventors: John E. Ferriday, Stourbridge; Brian J. Kendall-Smith, Birmingham; Michael L. Bradley, Netherton, all of England

[73] Assignee: British Industrial Plastics Limited, Manchester, England

[22] Filed: July 23, 1974

[21] Appl. No.: 491,135

Related U.S. Application Data

[63] Continuation-in-part of Ser. No. 356,798, May 3, 1973, abandoned.

[30] Foreign Application Priority Data

May 4, 1972 United Kingdom............... 20815/72

[52] U.S. Cl. .......................... 260/2.5 F; 260/17.3; 260/17.4 CL; 260/21
[51] Int. Cl.² ........................................... C08J 9/00
[58] Field of Search .................. 260/2.5 F, 9 R, 17.3

[56] References Cited
UNITED STATES PATENTS

| 3,038,867 | 6/1962 | Czepiel............................ 260/2.5 F |
| 3,047,538 | 7/1962 | Steinmann...................... 260/2.5 F |
| 3,637,548 | 1/1972 | Standish et al................... 260/2.5 F |

FOREIGN PATENTS OR APPLICATIONS

| 2,086,303 | 1972 | France................................ 260/9 R |
| 1,311,421 | 3/1973 | United Kingdom................. 260/9 R |

Primary Examiner—Richard B. Turer
Attorney, Agent, or Firm—Cushman, Darby & Cushman

[57] ABSTRACT

Aminoplastic moulding compositions include a filler which comprises or consists of a cured particulate aminoplast material having a water absorption (absorbency) of less than 2 milliliters of water per gram; the aminoplast filler material preferably is a hydrophobic ureaformaldehyde foam which has been disintegrated prior to incorporation in the resin component of the composition.

9 Claims, No Drawings

FILLED AMINOPLAST MOULDING MATERIALS

CROSS REFERENCE TO RELATED APPLICATION

This is a continuation-in-part of our earlier application Ser. No. 356,798 filed May 3, 1973 and now abandoned.

BACKGROUND OF THE INVENTION

This invention concerns improvements in or relating to filled aminoplast moulding materials.

Our co-pending patent application Ser. No. 337,538 filed Mar. 2, 1973 and now abandoned in the name of Cutler and Bradley describes an amino moulding material which comprises a resin matrix including an amino-formaldehyde resin and dispersed in the matrix a filler including a particulate cured amino-formaldehyde resin having a water-absorbency of at least 2.0 ml. of water per gram.

DETAILED DESCRIPTION OF THE INVENTION

According to the present invention there is provided an aminoplastic moulding composition in which the filler comprises, at least in part, a particulate cured aminoplast material having an absorbency of less than 2.0 milliliters of water per gram.

The "absorbency", as referred to herein and in the claims, is that determined by masticating one gram of the particulate cured aminoplast material on a non-absorbent substrate such as a glass plate whilst adding water to the material, the abosrbency being defined as the maximum volume of water absorbed by the material without separation of the water being visually noticeable. This test is effected at ambient temperature.

For the purposes of this specification, the aminoplast materials with an absorbency of less than 2.0 mls. of water per gram are considered to be hydrophobic.

The present invention also provides a method of manufacturing the moulding composition aforesaid, comprising dispersing a particulate. cured amino-formaldehyde material having an absorbency of less than 2.0 mls. of water per gram, in an amino-formaldehyde resin.

The present invention further provides (i) a moulding material when made by the method aforesaid; (ii) a process for manufacturing moulded articles by moulding the moulding material aforesaid; and (iii) moulded articles made by the process aforesaid.

It is presently preferred to employ a particulate hydrophobic, foamed urea-formaldehyde plastics material as filler with urea-formaldehyde or melamine-formaldehyde resin. It will be noted that the aminoplast material of the filler is itself unfilled.

As in the known processes for manufacturing amino-formaldehyde moulding materials filled with α- cellulose, it is possible in the method of this invention to disperse the particulate, cured hydrophobic amino-formaldehyde filler in the amino-formaldehyde resin, or to use a "wet mix" technique in which the amino-formaldehyde resin is used in the form of a syrup.

In the dry compounding technique, there is no limit to the proportion of particulate cured hydrophobic aminoformaldehyde resin used as filler to replace cellulose or other material as filler, but by the wet mix technique a practical limit is set for replacement of the filler with hydrophobic amino-formaldehyde resin, owing to the poor absorption properties of the hydrophobic amino-formaldehyde resin. For example, for a resin to filler ratio of 72:28 the practical limit is 65% by weight of hydrophobic amino-formaldehyde filler, based on the total weight of filler.

The aminoplast filler material preferably is a urea-formaldehyde material of the type used for cavity wall insulation, in a particulate state, achieved by milling the material in foam form. A preferred milled urea-formaldehyde foam has an absorbency of 1.4 mls. $H_2O$/gram. The weight ratio of the particulate cured aminoplast material to the cellulose filler preferably is within the range from 1:10 to 10:1. The preferred resin to filler weight ratio is within the range from 50:50 to 85:15.

DESCRIPTION OF PREFERRED EMBODIMENTS OF THE INVENTION

The following examples are given to illustrate preferred embodiments of the invention, "parts" being parts by weight.

EXAMPLE 1

A resilient hydrophobic urea-formaldehyde cured foam was dried in a Mitchell Oven at 110°C and ball milled to produce a particulate mass of absorbency 1.4 ml. of $H_2O$ per gram. 451 parts of this particulate material were dry blended in a sigma blade mixer with 451 parts of α-cellulose, 1,863.6 parts of a spray dried melamine-formaldehyde resin (melamine:formaldehyde = 1:2), 1.5% polyvinyl acetate, 0.5% phthalic anhydride, 0.36% of glycerol monostearate, and 0.11% zinc oxide, the percentages quoted being based on the total weight of filler and resin matrix. The resultant dry mixture was compounded on heated differential rolls at about 120°C and then kibbled to form granules.

EXAMPLE 2

The procedure of Example 1 was repeated except that a spray dried resin having a reduced melamine:formaldehyde ratio (1:1.5) was used.

EXAMPLE 3

The procedure of Example 2 was repeated escept that 902 parts of the particulate hydrophobic urea-formaldehyde foam were used in place of the 451 parts of foam and 451 parts of α-cellulose.

EXAMPLE 4 (Comparative)

A standard urea-formaldehyde moulding composition was obtained by mixing 3,664 parts of urea-formaldehyde resin syrup with 896 parts of α-cellulose in a 2-blade mixer. Additions of 12 parts of an accelerator, 43.5 parts of hexamethylenetetramine, 14 parts of zinc stearate, 29 parts of monocresylglyceryl ether and 59 parts of barium sulphate were made. The resulting mixture was heated to 60°C for 30 minutes and was then over-dried at 80°C to a free water content of from 1 to 2%, and the dried material was ball-milled. A further addition of 0.2% of zinc stearate was made. The resultant fine powder was granulated and kibbled to give a moulding composition.

EXAMPLE 5

The procedure of Example 4 was repeated except that the 896 parts of α-cellulose were replaced by a mixture of 448 parts of dried, ball-milled, resilient hydrophobic urea-formaldehyde foam made by the method described in our U.K. Patent Specification No. 1,313,103. Also, an addition of 0.05% calcium hydroxide was made to neutralise residual acid in the urea-formaldehyde foam.

Mouldings were made from each of the moulding materials made as described in the above Examples and BS 1322 tests carried out on the mouldings. The results are shown in the following table:

| Example<br>Test | 1 | 2 | 3 | 4 | 5 |
|---|---|---|---|---|---|
| Mould Shrinkage % | .82 | .88 | .82 | .70 | .82 |
| After Shrinkage % | .88 | .75 | .68 | .70 | .52 |
| Cold Water Absorption (mg) | 44 | 40 | 70 | 60 | 26 |
| Boiling Water Absorption (mg) | 63 | 61 | 77 | 300 | 147 |
| Electric Strength Cold Moulded (V/mil) | 144 | 133 | 139 | 200 | 197 |
| Electric Strength Preheated (V/mil) | 148 | 162 | 156 | 220 | 227 |
| Surface Resistivity after H$_2$O Immersion (log ohm) | 13.2 | 13.3 | 14.0 | 14.0 | 13.9 |
| Volume Resistivity (log ohm cm) | 13.1 | 13.3 | 13.4 | 13.0 | 13.5 |
| Flexural Strength (lb/sq.in) | 12,500 | 11,000 | 12,500 | 13,500 | 14,000 |
| Specific Gravity | — | — | — | 1.51 | 1.49 |

In all cases the mouldings had a very high gloss and it can be seen that the physical properties of the products of Example 4 (our co-pending application Ser. No. 280,164) and Example 3 are comparable.

EXAMPLE 6 (Comparative)

2,143 parts of a solid urea-formaldehyde resin powder and 896 parts of α-cellulose were mixed in a Baker Perkins mixer and additions of the following materials made, the percentages being by weight of the resin-filled mix:

| | |
|---|---|
| Hexamethylenetetramine | 2% |
| Polyvinylacetate | 1.5% |
| Polypropyleneglycol | 0.5% |

Based on the total weight of the mix, 0.25% of zinc stearate was post-blended.

The composition was compounded on differential rolls at about 120°C, kibbled and a disc flow test carried out on the resultant material. Disc flow was 0.020 inch.

EXAMPLE 7

The process of Example 6 was repeated, except that the 896 parts of α-cellulose were replaced with 448 parts of α-cellulose and 448 parts of the ball-milled hydrophobic urea-formaldehyde resin referred to in Example 5. The resultant material had a disc flow of 0.022 inch.

Study of the above results will show that all or a significant proportion of the usual paper filler can be replaced with particulate, cured, foamed hydrophobic amino-formaldehyde resin, with substantially no diminution, and indeed even with an improvement, in physical and mechanical properties, and with the benefit of cost reduction, since the fillers usable in accordance with this invention are cheaper than α-cellulose fillers.

We claim:

1. A thermosetting moulding composition including an amino-formaldehyde resin and a filler composed of α-cellulose dispersed therein, at least about 9% by weight of said filler replaced by a particulate, disintegrated, cured, unfilled amino-formaldehyde foam material having an absorbency of less than 2.0 milliliters of water per gram, wherein the weight ratio of the particulate, cured foam filler to the cellulose filler is within the range of from 1:10 to 10:1.

2. The thermosetting moulding composition of claim 1 wherein the particulate foam is urea-formaldehyde.

3. The thermosetting moulding composition of claim 1 wherein the filler is a mixture of substantial portions of α-cellulose and the cured, particulate filler.

4. The thermosetting moulding composition of claim 1 wherein the resin to filler weight ratio is within the range of from 50:50 to 85:15.

5. A thermosetting moulding composition including an amino-formaldehyde resin and a filler dispersed therein, the filler comprising a mixture of (a) a particulate, disintegrated...cured, unfilled amino-formaldehyde foam material having an absorbency of less than about 1.8 mls. of water per gram and (b) α-cellulose filler, the weight ratio of (a) to (b) within the range of from about 1:10 to 10:1.

6. The thermosetting moulding composition of claim 5 wherein the filler foam has an absorbency on the order of about 1.4 mls of water per gram.

7. A method of manufacturing a thermosetting moulding composition including an amino-formaldehyde resin and filler composed of substantial proportions of α-cellulose and unfilled, disintegrated amino-formaldehyde foam including dispersing a particulate, disintegrated, cured, unfilled amino-formaldehyde foam having an absorbency of less than about 1.8 mls. of water per gram and α-cellulose in a weight ratio of about 1:10 to 10:1 into an amino-formaldehyde resin matrix as the filler therein.

8. The method according to claim 7 wherein the filler materials are dry compounded and blended with the matrix material.

9. The thermosetting moulding composition produced by the method as claimed in claim 8.

* * * * *